Sept. 20, 1938. D. C. FEATHER 2,130,539
SHEARS
Filed Feb. 10, 1937
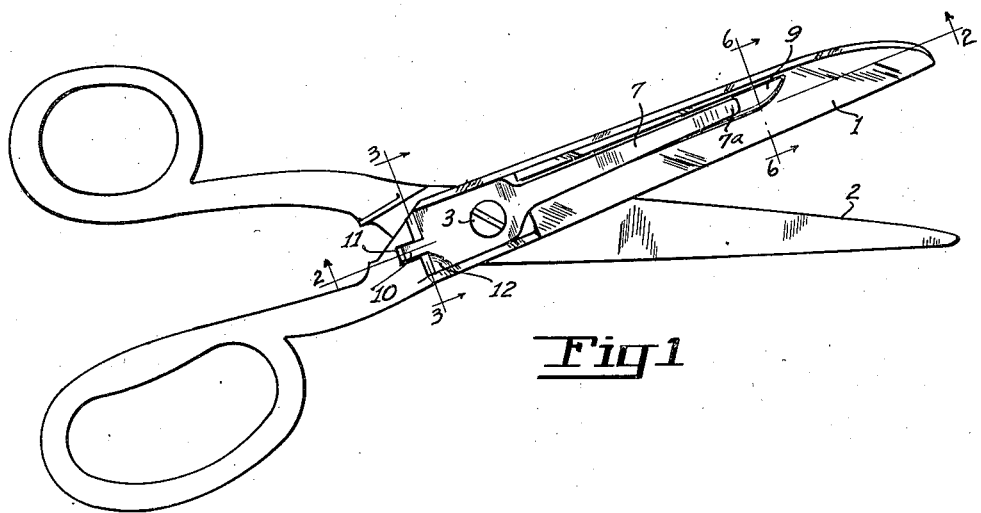
Fig.1
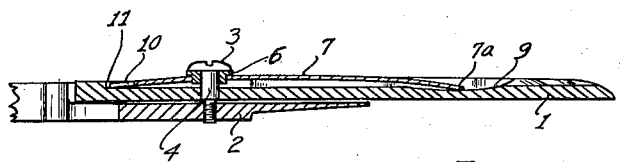
Fig.2
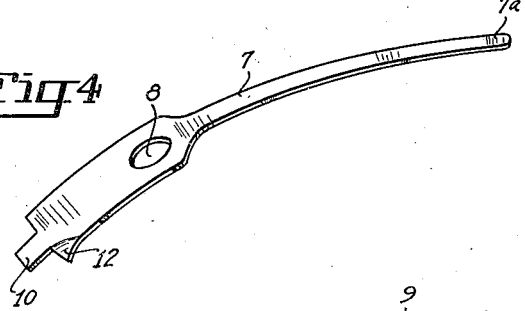
Fig.4
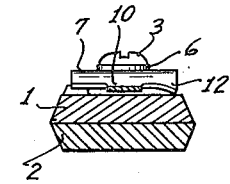
Fig.5
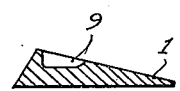
Fig.6
Fig.3
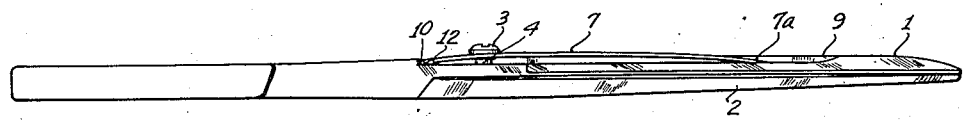
Fig.7
David C. Feather
INVENTOR
BY
ATTORNEY Patented Sept. 20, 1938

2,130,539

UNITED STATES PATENT OFFICE 2,130,539

SHEARS

David C. Feather, Portland, Oreg., assignor to N. and F. Corporation, Portland, Oreg., a corporation of Oregon Application February 10, 1937, Serial No. 125,071

4 Claims. (Cl. 30—268)

This invention relates to shears, and has particular reference to shears which employ an attachment for applying tension to the shear blades.

It is an object of the invention to provide shears and the like having a device for applying tension to the shear blades, by means of which the tension is relieved at the pivotal point and is distributed evenly throughout the length of the blades.

A further object of the invention is to provide shears and the like having a device for applying tension to the shear blades, while at the same time avoiding any pressure on the pivot screw.

A further object of the invention is to provide shears and the like having a device for urging the cutting edges of the blades into cutting relation as the blades close together.

A further object of the invention is to provide shears and the like having a device for applying tension to the shear blades at the extreme ends of the blades without adding to the bulk of the instrument.

Further objects of the invention relate to ease of operation, self-sharpening features, simplicity of design and economy in manufacture and use. Reference is made to the accompanying drawing, in which:

Figure 1 is a plan view of a pair of shears embodying the present invention.

Figure 2 is a longitudinal sectional elevation taken on the line 2—2 of Figure 1.

Figure 3 is a transverse sectional elevation taken on the line 3—3 of Figure 1.

Figure 4 is a perspective view of the tension member.

Figure 5 is a detail elevation of the pivot screw and related parts.

Figure 6 is a transverse sectional elevation of one shear blade, taken on the line 6—6 of Figure 1.

Figure 7 is a side elevation of the shears illustrated in Figure 1, the view being taken from the right of the latter figure.

Referring to the drawing, the shears are illustrated as having blades 1 and 2 which are pivoted upon a screw 3 and adapted to be opened and closed in the usual manner for cutting or severing material. The screw 3 has an enlarged portion 4 which forms the bearing upon which the blade 1 turns, the end of the screw being threaded to engage the blade 2. Preferably the screw 3 is equipped with a sleeve 5, having a shoulder or flange 6, which forms a bearing for a cantilever spring 7 to avoid any possibility of friction between the screw 3 and the spring 7.

The spring 7 is bent or curved in the form of a bow, as best illustrated in Figure 4, and is provided with an opening 8 to receive the bearing sleeve 5. The greater portion of the spring 7 extends forwardly from the bearing point toward the point of the shears, pressure being exerted upon the blade 1 by the extreme forward end 7a of the spring in proximity to the end of the blade. Both arms of the spring extend radially from the bearing point, the rearward arm of the spring conforming in width to the squared portion of the blade, and the forward end of the spring tapering in proportion to the pitch of the blade, the spring being thus designed to lose its identity in the lines of the shears. The spring 7 is supported intermediate its ends by the bearing sleeve 5, and may be described as floatingly mounting the shears, since neither of its ends is secured to the shear blade, allowing free expansion of the spring as the shears are opened and closed.

It will be observed that the spring 7 occupies a recess 9 in the shear blade, the purpose of which is twofold. Primarily, the recess in the blade is to permit the forward end of the spring 7 to be of such length as to bear upon the shear blade at a point nearer the tip of the blade than its heel. The long arm of the spring applies pressure at the correct point to secure perfect cutting with the tops of the blades throughout the life of the shears. It will be appreciated that to mount the spring 7 upon the shears without recessing the blade would be to create an instrument of such bulk, and so clumsy in "feel" and appearance, that no manufacturer would endeavor to market the product. On the other hand, applicant's shears present no revolutionary change in appearance from such instruments as are commonly in use, and so avoids the sales resistance likely to be offered to any such shears which did not recess the spring within the blade. Secondly, the recessed blade prevents displacement of the floatingly mounted spring. A central projection 10 is provided at the rear end of the spring to occupy an extension 11 of the recess in the blade to prevent displacement of the rear end of the spring. Likewise, as best seen in Figure 2, where the forward end 7a of the spring bears upon the blade the recess is of slightly greater depth than elsewhere to prevent the spring from slipping out of the shallow side of the recess on the beveled surface of the blade.

In applicant's shears the opening in the blade 1 through which passes the pivot screw 3 is made oversize, by means of which the blade may be rocked from side to side upon its bearing 4. To maintain the cutting action of the shears as the blades are closed, the spring 7 is kinked or bent downwardly at the inside rear corner, as indicated at 12. By this expedient the cutting edge of the blade 1 is held in proper tension to close against the edge of the blade 2 without the necessity of any thumb and finger squeeze by the user. This feature enables the use of the shears with either the right or left hand with equal efficiency. In this connection it may also be stated that the opening 8 in the tension member 7 is also made oversize, as is also the bore of the bearing sleeve 5, to prevent binding of the shears at the pivotal point.

Having now described my invention and in what manner the same may be used, what I claim as new and desire to protect by Letters Patent is:

1. Shears and the like, comprising a pair of pivoted blades adapted to be closed together for cutting material, a pivot screw for maintaining said blades in pivotal relation, said screw forming a bearing for one of said blades, said blade rockably mounting said bearing, a tension member mounting said blade for applying tension to said shears, said tension member being supported intermediate its ends and having its ends floatingly bearing upon said blade, a portion of said tension member being turned down against said blade in substantial alignment with the cutting edge of said blade to urge said cutting edge into cutting relation with the other blade.

2. Shears and the like, comprising a pair of pivoted blades adapted to be closed together for cutting material, a pivot screw for maintaining said blades in pivotal relation, said screw forming a bearing for one of said blades, a tension member mounting one of said blades for applying tension to said shears, and a bearing for said tension member, said bearing being in the nature of a sleeve loosely fiting said pivot screw, the ends of said tension member extending radially from said bearing and floatingly bearing upon the shear blade at points separated by approximately two-thirds the length of the blade, a portion of said tension member bearing upon said blade at a point in substantial alignment with the cutting edge of said blade to rockably urge the cutting edge into cutting relation with the other blade.

3. Shears and the like, comprising a pair of pivoted blades adapted to be closed together for cutting material, a tension member mounted on one of said blades for applying tension to the blades intermediate between their pivotal connection and the ends of the blades, said tension member bearing upon said blade by means of a two point support, one of which points of support applies pressure upon said blade in substantial alignment with the cutting edge of the blade to urge its cutting edge into cutting relation with the other blade.

4. Shears and the like, comprising a pair of blades adapted to be closed together for cutting material, and an arched spring mounted on one of said blades for applying tension to said blades, said spring extending along the longitudinal axis of said blade and bearing on said blade at its ends, a portion of said spring being turned down against said blade in substantial alignment with the cutting edge of the blade to urge said cutting edge into cutting relation with the other blade.

DAVID C. FEATHER.